US005692586A

United States Patent [19]
Akamatsu et al.

[11] Patent Number: 5,692,586
[45] Date of Patent: Dec. 2, 1997

[54] BRAKE HAVING A PRESSURE RESPONSIVE SLACK ADJUSTER

[75] Inventors: Osamu Akamatsu, Akashi; Yoshio Asano, Kobe; Toshiyuki Matsuoka, Miki, all of Japan

[73] Assignee: Nabco Ltd., Wilmerding, Pa.

[21] Appl. No.: 605,506

[22] Filed: Feb. 26, 1996

[30] Foreign Application Priority Data

Feb. 27, 1995 [JP] Japan .................. 7-064858

[51] Int. Cl.⁶ .................................. F16D 65/18
[52] U.S. Cl. .................. 188/198; 188/196 V; 188/202
[58] Field of Search .......................... 188/199, 197, 188/196 P, 196 D, 202, 203, 198, 153 R, 196 V, 71.2, 72.1

[56] References Cited

U.S. PATENT DOCUMENTS

| | | | |
|---|---|---|---|
| 4,756,391 | 7/1988 | Agarwal et al. | 188/216 X |
| 4,993,521 | 2/1991 | Asano et al. | 188/203 |

FOREIGN PATENT DOCUMENTS 59-192666  11/1984  Japan .
2-266130   10/1990  Japan .

*Primary Examiner*—Peter M. Poon
*Attorney, Agent, or Firm*—James Ray & Associates

[57] ABSTRACT

A brake device equipped with an actuator having a power-transmission member generating a pushing force by receiving a drive force so as to advance. A pressure-detection device is provided for detecting the reaction pressure being applied to the power-transmission member and a clearance controller is provided for making the power-transmission member perform a return stroke. A brake shoe is attached to the power-transmission member and generates a braking force on the wheel tread surface. Such clearance controller is provided with a stroke memory unit which detects when the pressure signal from the pressure-detection device has reached a reference value when the pushing force of the power-transmission member is output and memorizes the stroke position of the power-transmission member as the reference stroke position. A computational processor determines the return stroke position by which the power-transmission member is separated from the wheel tread surface and the clearance stroke fraction established in advance using the reference stroke position, when the pushing force is released.

10 Claims, 5 Drawing Sheets

BRAKE HAVING A PRESSURE RESPONSIVE SLACK ADJUSTER

FIELD OF THE INVENTION

The present invention relates, in general, to railway type braking equipment and, more particularly, this invention relates to a brake device provided on railroad rolling stock which generates a braking force by pushing brake shoes against the tread surfaces of the wheels and to a method of operating such brake device by means of a computer to improve efficiency and reliability.

BACKGROUND OF THE INVENTION

One conventional brake device for railroad rolling stock is the tread brake device which generates a braking force by pushing brake shoes against the tread surface of the wheels as has been disclosed, inter alia, in Japanese Laid-Open Patent Application (JP-A) Sho. 59-192666 and Japanese Examined Utility Model Application (JU-B) Hei. 4-4936. The necessary braking force is generated, in these tread braking devices, by transmitting the output of a brake cylinder, via a cylinder lever, to a push-rod to which a brake shoe has been attached and thereby moving the brake shoe, which is provided on the push-rod on its wheel end, toward the wheel.

As is generally quite well known in the railway braking art, air pressure has generally been used as the means for generating the required braking force in the prior art type railroad braking devices. Even though such air pressure provides the important advantage of good reliability, it still exhibits certain inherent disadvantages in its use. Such disadvantages at least include the weight of the rolling stock. Such weight being required due to the necessity for responsiveness as well as the numerous items of pneumatic equipment (such as air reservoirs and the like). For this reason, it has been difficult to satisfy the requirement of the railroads for increased speeds in modern rolling stock.

Meanwhile, by way of a brake device which responds to the increasing speed of rolling stock, JP-A Hei. 2-266130 discloses what is termed a purely electrical type braking device. As is taught therein, this particular brake device is equipped with an actuator which is capable of directly converting an electrical command signal into a braking force. Such actuator employs a disc brake device which imparts a braking force to a brake disc attached to the wheel axle. In addition, this actuator can be used instead of the brake cylinder in the above-mentioned tread type brake device.

The principle component parts of this purely electrical type braking device, equipped with such an actuator, include an energy-storage member in the form of a coil spring, an energy-supply member in the form of a motor which supplies the required energy to the energy-storage member, a power-transmission member, a movement-conversion member, such as a spindle and ball nut, which converts a turning movement into a movement in the axial direction of the power-transmission member, a drive sleeve which transmits a turning movement from the energy-storage member to the movement-conversion member and a clutch/control member in the form of an outer lock screw and an inner lock screw that is positioned between the movement-conversion member.

Additionally, in this known electrical type brake device, the turning movement stored in such energy-storage member, due to the revolution of such energy-supply member, is transmitted from such drive sleeve, via the clutch/control member, to such movement-conversion member. This turning movement is converted to movement in the axial direction by such movement-conversion member to move the power-transmission member in a straight line and the brake pad is pushed against the brake disc to generate the required braking force. The braking force being applied is detected as a pressure reaction by a pressure-detector which is provided inside the actuator and is adjusted to the desired value.

Again, in order to release the braking force being applied, the power-transmission member is withdrawn until the reaction from the above-mentioned brake disc is reduced to a predetermined value which is taken to mean that the braking force has been released. Then the power-transmission member is further withdrawn by a fixed amount from the withdrawn position at which this value is given so that the desired clearance is obtained between the brake pad and brake disc.

However, the following problems occur when an actuator in a purely electrical type brake device, as described above, is used as a tread brake device.

In railroad rolling stock, the wheels are attached to the bogie or truck via axle springs and in the latest or more modern railroad rolling stock soft axle springs have been used. Such soft axle springs are used in order to provide improved riding characteristics and the like.

For this reason, however, the amount of axle displacement is not always constant, but depends on the size of the force acting when the brake shoe is pressed against the tread surface of the wheel.

Thus, even though an attempt to maintain the desired amount of clearance between the wheel's tread surface and the brake shoe is made, when using the above-mentioned prior tread brake device that employs an actuator and by the above-mentioned method of withdrawing by a fixed amount from the position in which the reaction from the brake shoe is reduced to a predetermined value, there is a problem in that the deflection of the axle spring is not cancelled when the predetermined value is reached and afterwards the desired amount of clearance is reduced when the deflection is cancelled and the brake shoe contacts the tread surface of the wheel which causes abrasion type wear of the brake shoe to occur.

Furthermore, when the railroad rolling stock is operating on the tracks and, particularly when operating on the curved portion of such tracks, the wheel axles attempt to move at right angles to the track. This is due to the above-mentioned axle springs and, therefore, there will be different clearances between the inner and outer brake shoes and the wheel tread surfaces on such above-mentioned tracks. (In other words, they are displaced relative to each other. See FIG. 4 (b).

Now, one can consider making the time when the deflection of the wheels is cancelled the reference position in which the desired amount of clearance is obtained, but the amount of deflection will differ every time the braking force is applied due to the running conditions and the like and the reaction when the deflection is cancelled is not always constant so that it is not possible to obtain a constant amount of clearance by this means either.

There is therefore a problem in that, even assuming that the desired amount of clearance is obtained on the above-mentioned curved portion of the tracks, the above-mentioned clearance is narrowed or widened and the desired clearance is not obtained if, for example, the relative displacement between the bogie and wheels is cancelled as the rolling stock runs on the straight portion of the tracks.

Thus, there is a problem in that, even if one attempts to maintain the amount of clearance between the brake pad and brake disc in this purely electrical type brake device by the above method, the clearance between the brake shoe and the tread surface of the wheel varies continuously due to the amount of relative movement or displacement mentioned above.

The present invention has been devised to overcome this problem and to provide a railway brake device that is able to maintain the desired clearance between itself and the tread surface of the wheel by moving the brake shoe by an appropriate amount depending on the wheel running conditions when the brake is released.

SUMMARY OF THE INVENTION

The present invention provides a railway brake device which is equipped with an actuator having a power-transmission member attached to the bogie and generating a pushing force by receiving a drive force and moving so as to advance to a brake position. A pressure-detection means detects the reaction being applied to the power-transmission member. There is a clearance controller provided for making the power-transmission member perform a return stroke. Such return stroke is based on the pressure signal from the pressure-detection means. A brake shoe is attached to the above-mentioned power-transmission member that generates a braking force by being pushed against the wheel tread. In this brake device the above-mentioned clearance controller is provided with a stroke memory which detects when the pressure signal from the pressure-detection means has reached a reference value when the pushing force of the above-mentioned power-transmission member is output and memorizes the stroke position of the above-mentioned power-transmission member at this time as the reference stroke position. There is a computational processor which determines the return stroke position by which the above-mentioned power-transmission member is separated from the above-mentioned wheel tread and the clearance stroke fraction is established in advance using the reference stroke position, when the pushing force is released.

Additionally, the present invention provides a railway brake device in which the above-mentioned stroke memory includes the desirable function of memorizing the preceding reference stroke and the above-mentioned computational processor adds a setting value fraction that is smaller than the amount of relative displacement between the wheel and bogie to the preceding reference stroke position and so produces the current reference stroke position and above-mentioned return stroke position when the stroke position upon reaching the current reference value of the above-mentioned power-transmission member exceeds the preceding reference stroke position.

A railway brake device is also provided according to the present invention in which the above-mentioned computational processor uses the stroke position upon reaching the current reference value or the preceding reference stroke position as the above-mentioned return stroke position and the current reference stroke position and stores the above-mentioned current reference stroke position in the stroke memory when the difference between the stroke position upon reaching the current reference value of the above-mentioned power-transmission member and the previous stroke position is less than the above-mentioned setting value.

Finally, the present invention provides a railway brake device in which the above-mentioned stroke memory includes the function of memorizing the preceding reference stroke and in this embodiment the above-mentioned computational processor takes the preceding reference stroke position as the current stroke position and the above-mentioned return stroke position when the stroke position upon reaching the current reference value does not exceed the preceding reference stroke position.

OBJECTS OF THE PRESENT INVENTION

It is, therefore, one of the primary objects of the present invention to provide an electrical type railway brake device which can maintain a predetermined amount of clearance between itself and a tread surface of a wheel by moving the brake shoe by a suitable amount corresponding to the wheel running conditions when the brake is released.

Another object of the present invention is to provide an electrical type railway brake device which is both reliable and significantly reduces the overall weight of the railway car to which it is attached.

Still yet another object of the present invention is to provide an electrical type railway brake device which can be advantageously controlled by a microprocessor.

In addition to the various objects and advantages of the electrical type brake device of the present invention described above, various other objects and advantages of the invention will become more readily apparent to those persons who are skilled in the railway car braking art from the following more detailed description of the invention, particularly, when such detailed description is taken in conjunction with the attached drawing Figures and with the appended claims.

DETAILED DESCRIPTION OF A PRESENTLY PREFERRED EMBODIMENT OF THE INVENTION

Figure 1:
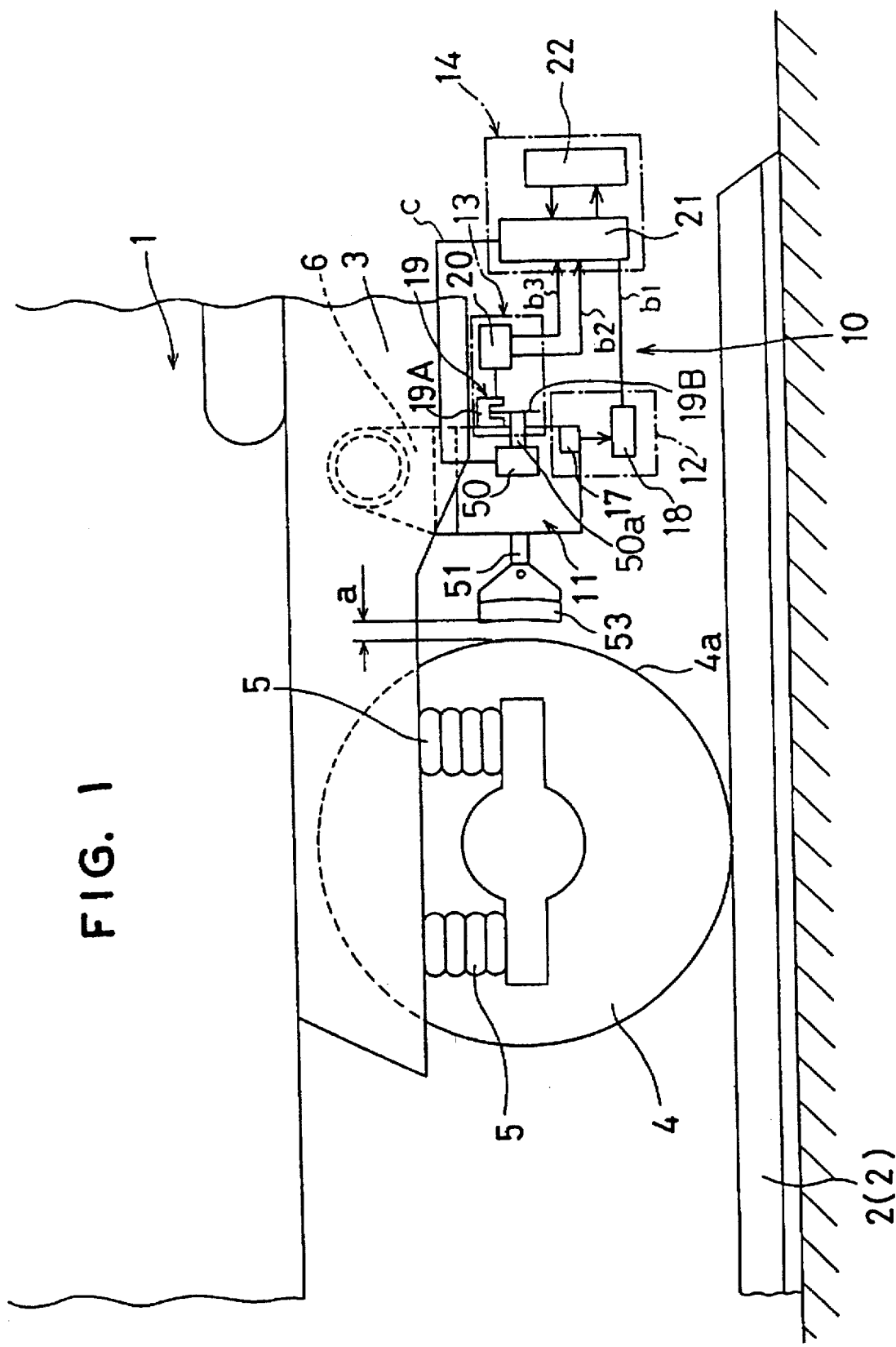
FIG. 1 is a block diagram which illustrates the overall configuration of the brake device according to one presently preferred embodiment of the instant invention.

Prior to proceeding to the more detailed description of the present invention, it should be noted that identical components having identical functions have been identified with identical reference numerals throughout the several views illustrated in the drawings for the sake of clarity and understanding of the invention.

A railway vehicle brake device, generally designated 10, constituting one presently preferred embodiment of the instant invention will now be described below with particular reference to the various Figures illustrated in the drawings.

As illustrated in FIG. 1, there is provided railroad driven rolling stock 1 and/or associated undriven rolling stock, having a bogie 3 or truck positioned to operate on railroad tracks 2. The bogie 3, as is quite well known in the railway art, is pivotally supported on its wheels 4 in a manner which provides freedom to turn on the curved portions of such track.

The circumferential surface (referred to hereinbelow as the tread surface 4a.) of this wheel 4 rotates while in contact with the tracks 2. Axle springs 5, which extend between the bogie 3 and the wheel 4, are provided. Also, the actuator 11, of the brake device 10 of the present embodiment, which generates the braking force for stopping the wheel 4 from turning is securely supported on the bogie 3 via a support bracket 6. In the present invention, this actuator 11 is purely an electrical device.

Figure 2:
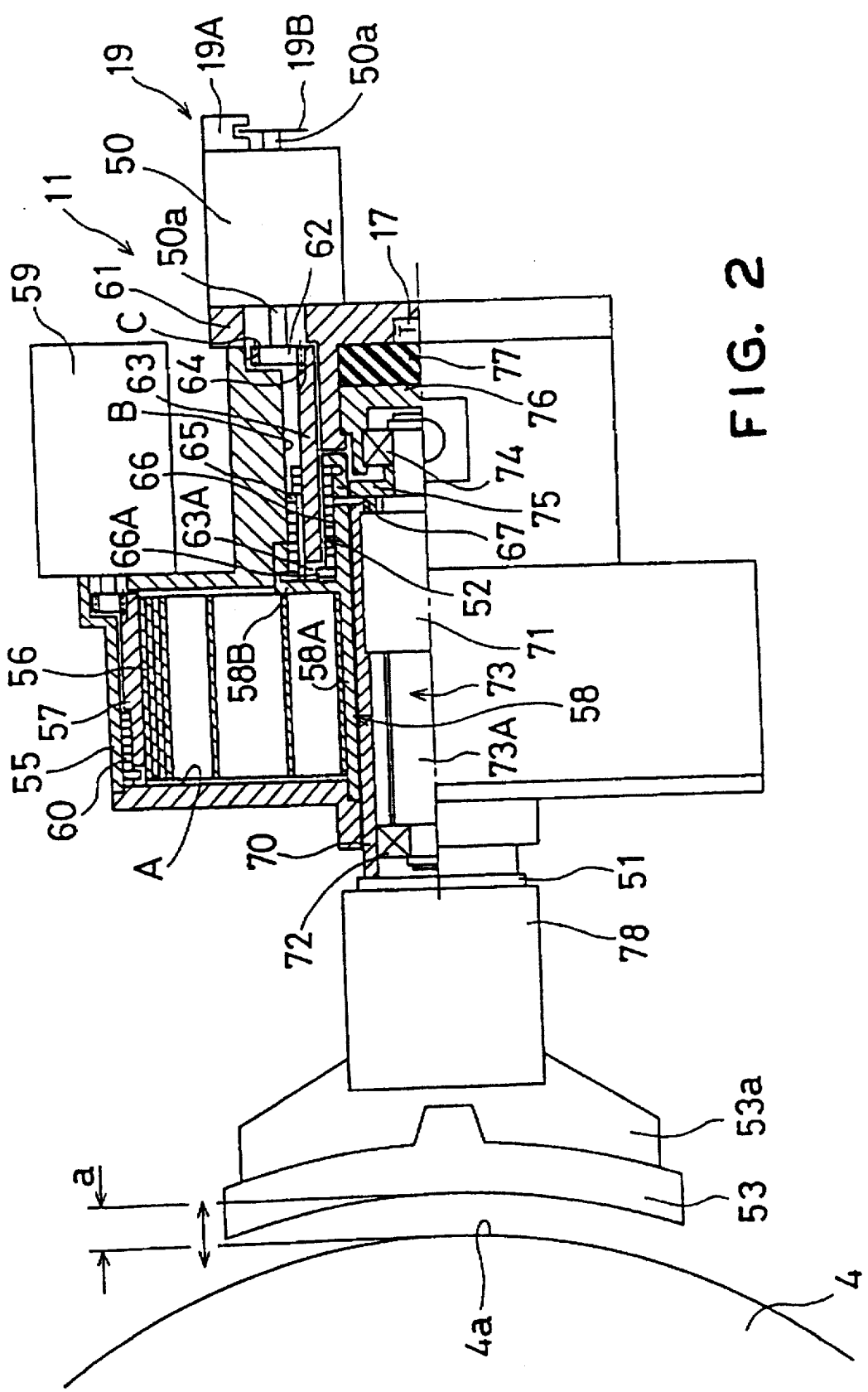
FIG. 2 is a longitudinal cross sectional view which illustrates a purely electrical moving device for the brake device produced in accordance with one embodiment of the present invention.

The main constituent components of the brake device 10 include the actuator 11, to be described in greater detail later with reference to FIG. 2, for moving the brake shoe 53 forward and backward with respect to the above-mentioned tread surface 4a of the wheel 4 via a power-transmission member 51. There is a pressure-detection means 12, a position-detection means 13, and a clearance controller 14 which governs the control of both the forward and backward movement of the brake shoe 53 via such power-transmission member 51. The control of the desired and/or required clearance (a) between the brake shoe 53 and the tread surface 4a of the wheel 4 is achieved via the actuator 11.

The pressure-detection means 12 is incorporated into the actuator 11 and comprises a pressure detector 18 and a pressure converter 17 for detecting the reaction pressure from the wheel 4 being sustained by the power-transmission member 51 through the brake shoe 53, and, when the above-mentioned reaction pressure has reached a predetermined pressure (a reference value P, for example, P=2 KN) as determined by the pressure detector 18, the above-mentioned pressure converter 17 sends it as a pressure signal b1 to the clearance controller 14.

The position-detection means 13 comprises an encoder 19 which consists of a fixed yoke 19A, to be described in greater detail later with respect to FIG. 2, that is secured to the actuator 11, which will also be described in greater detail later with reference to FIG. 2, and a disc 19B. Such disc 19B moves in association with the fixed yoke 19A and is provided on the drive shaft 50a of the drive motor 50, likewise to be described in greater detail later with reference to FIG. 2. Such drive motor 50 is provided on the actuator 11 and there is a position detector 20 which will detect the stroke position of the power-transmission member 51 and the brake shoe 53 by counting position signals sent progressively from the encoder 19.

This position detector 20 inputs the position signals sent progressively from the encoder 19 and sends the counted stroke position to the clearance controller 14 as the braking stroke position signal b2 and return stroke position signal b3. In this embodiment of the invention, the clearance controller 14 includes a computational processor 21 and a stroke memory unit 22.

A setting value ST, which is an empirical value that is smaller than the amount of relative displacement between the wheel 4 and bogie 3, is set in the computational processor 21 and a computation is performed in which the input of the stroke position L1, based upon the braking stroke position signal b2 from such position detector 20 when such pressure detection means 12 has reached the pressure signal b1, is compared with the setting value ST and the preceding reference stroke position L(a-1) which is stored in the stroke memory unit 22, thereby determining the current reference stroke position La of the brake shoe 53 and power-transmission member 51, and the return stroke position LM including the clearance stroke Lb, so that a drive signal (c) based on the return stroke position LM is sent to the drive motor 50 and the reference stroke position La is sent to the stroke memory unit 22.

When it sends and receives the reference stroke position La sent from such computational processor 21, such stroke memory unit 22 erases the previously stored reference stroke position L(a-1) and memorizes and stores the reference stroke position La newly sent and received.

The details of the structure of the electrical actuator 11 of the brake device 10 will now be described with particular reference to FIG. 2. As clearly shown in FIG. 2, the main constituent components of the actuator 11 are a drive motor 50 constituting an energy-generating source, a power-transmission member 51 receiving the drive force of the drive motor 50 and generating an output force, a clutch member 52 maintaining the forward/backward position of the power-transmission member 51 when the output force of this power-transmission member 51 is generated and a brake shoe 53 attached to the front portion of the power-transmission member 51.

The housing 55 for the actuator 11 includes a plurality of stepped holes. Such stepped holes are formed on the inside of the housing 55 such that the accommodation space A, clutch hole B and motor hole C are progressively linked. A relatively powerful coil spring 56 is disposed in the accommodation space A of such housing 55 and the outer circumferential surface of this coil spring 56 is fastened onto a sleeve 57 which is interposed between the coil spring 56 and housing 55, while its inner circumferential surface closes the accommodation space A and is fastened onto a drive sleeve 58 contained in the housing 55.

There is a motor 59 provided on such housing 55 that engages with this sleeve 57 and it will only turn in one direction due to a lock spring 60 being positioned between it and the housing 55. Further, the coil spring 56 is rendered lockable. In the presently preferred embodiment of the invention, such drive sleeve 58 will be integrally formed from a cylindrical shaft portion 58A that extends across the accommodation space A and clutch hole B and from a large-diameter portion 58B which extends with increasing diameter toward the motor hole C.

The drive motor 50 is provided, via a structural lid 61, on the housing 55 in which the motor hole C opens and engages with a gear ring 64 formed on the outer circumference of a control sleeve 63 where the gear 62 provided at the tip of the drive shaft 50a is positioned inside the clutch hole B. There is a clutch member 52 located across the inside surfaces and outside surface of the control sleeve 63.

The main component parts of this clutch member 52 include an outer lock spring 65, which is preferably a coil spring, that is positioned between the outer circumferential surface of the control sleeve 63 and the large-diameter cylindrical shaft portion 58B of the drive sleeve 58 and an inner lock spring 66, which is also preferably a coil spring, positioned between the inner circumferential surface of the control sleeve 63 and the cylindrical shaft portion 58A of the drive sleeve 58.

The outer lock spring 65 is positioned such that one end is secured to the control sleeve 63 and the outer circumferential surface at the other end fastens onto the coaxial inner circumferential surface of such housing 55 and such drive sleeve 58. With respect to the inner lock spring 66, its inner circumferential surface fastens onto the outer circumferential surface of such cylindrical shaft portion 58A of such drive sleeve 58 and of the drive ring 67 positioned coaxially therewith and one of its ends is secured to the drive ring 67.

In addition, the other end of the inner lock spring 66 has formed on it a projecting edge portion 66A that extends radially outwards. This projecting edge portion 66A is provided so as to move in association with a projecting portion 63A formed on the control sleeve 63 on the edge to the side of the accommodation space A. Thus, the clutch 52 has a clutch function whereby it prevents the drive sleeve 58 from turning in one direction due to the outer lock spring 65 and transmits turning movement in one direction between the drive ring 67 the drive sleeve 58 due to the inner lock spring 66.

The drive-transmission member 51 is positioned to project from the accommodation space A side of the housing 55 and is linked to a drive-transmission sleeve 70 that runs through the inside of such drive sleeve 58 and with freedom to slide. This drive-transmission sleeve 70 is secured to the ball nut 71 positioned on the inside thereof and is supported by a ball bearing 72.

Furthermore, inside of such power-transmission sleeve 70, a spindle 73 that extends from the side with the drive-transmission member 51 to the bottom of the drive ring 67 is supported with freedom to turn by the ball bearing 72 and a ball bearing 74 which is positioned inside the clutch hole B. The screw shaft portion 73A of this spindle 73 is screwed on to the ball nut 71, through which it passes, via a plurality of balls (not shown). Additionally, the spindle 73 and the drive ring 67 are connected by spline fitting a spindle ring 75 provided on the end of the spindle 73 to the drive ring 67.

The brake device 10 includes a securing and supporting type cap member 76. There is a resilient disc 77 interposed between such cap member 76 and the housing 55. Furthermore, in this presently preferred embodiment of the invention, the pressure convertor 17 is provided inside the housing 55 and in contact with the resilient disc 77. The brake shoe 53 is attached to the attachment member 78 which, in turn, is secured to the end of the drive-transmission member 51, via a shoe head 53A, thereby forming a predetermined clearance (a) at the tread surface 4a of the wheel 4.

Figure 3A:
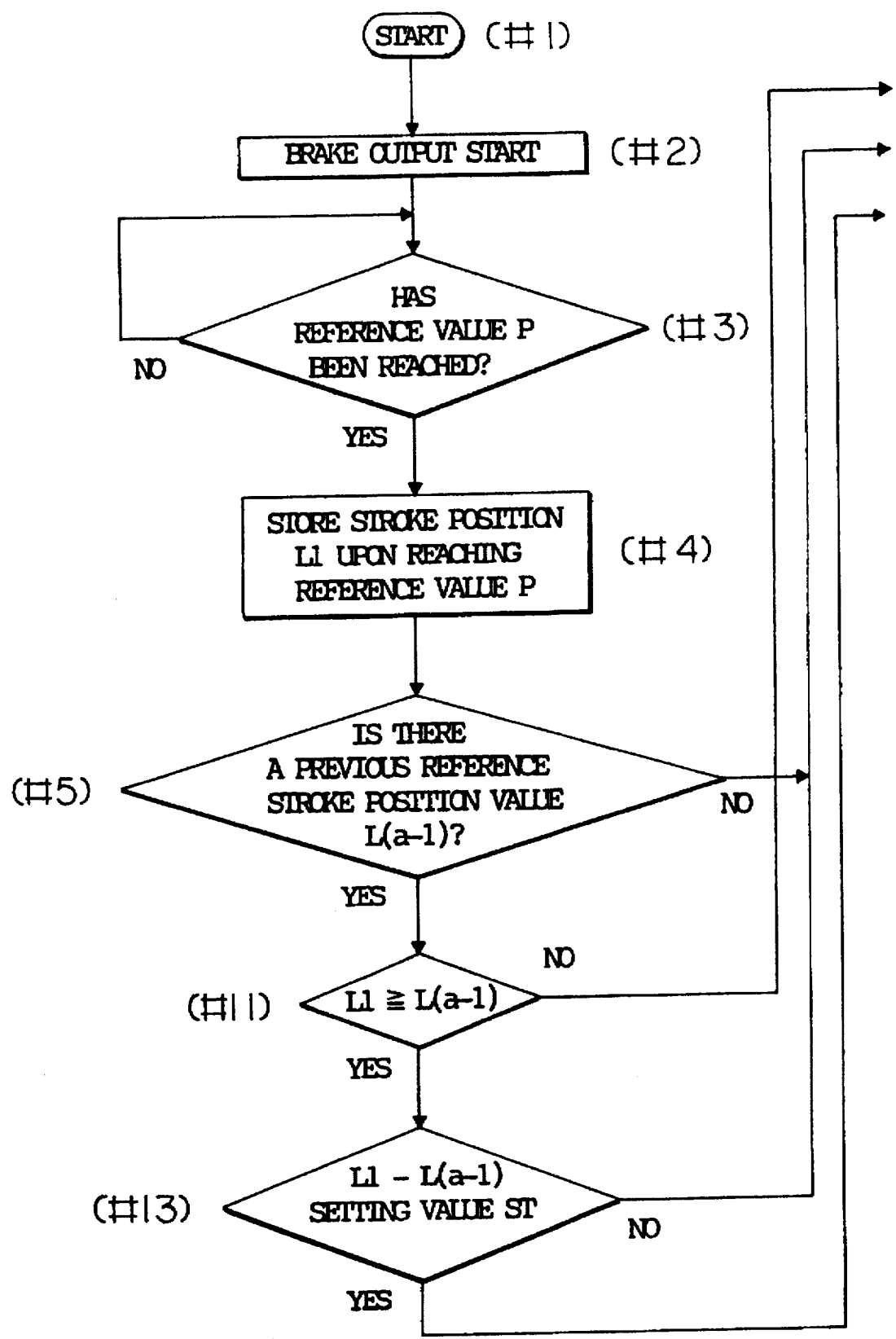
FIG. 3 is a flow chart illustrating the clearance control procedure in a brake device produced in accordance with one embodiment of the present invention.
Figure 3B:
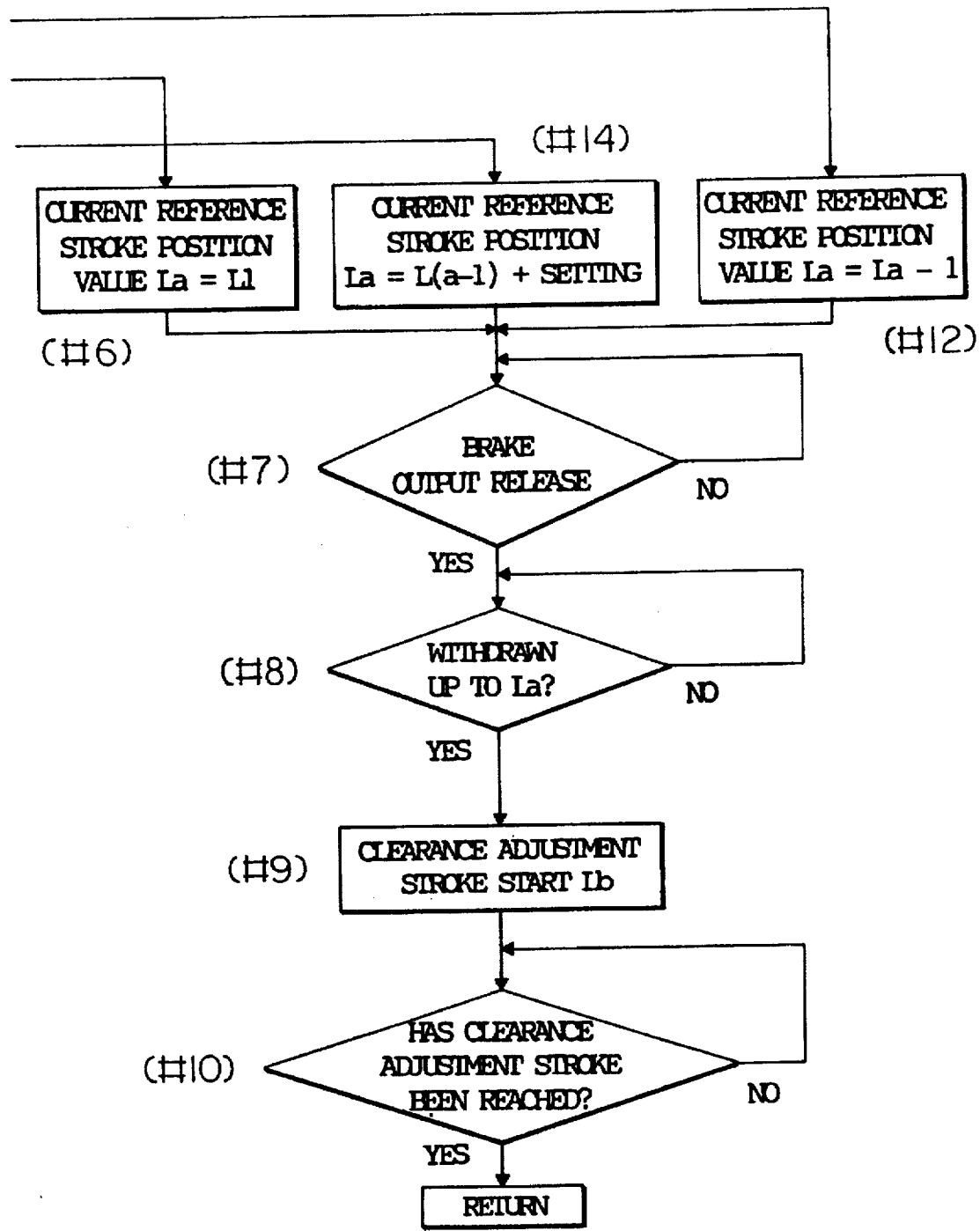

The brake device 10, in the presently preferred embodiment, is configured as described above and the clearance control method of the drive-transmission member 51 and brake shoe 53 in this brake device 10 will now be described with particular reference being made to the flow chart illustrated in FIG. 3 and the views of the brake device 10 illustrated in FIG. 4 (a) and in FIG. 4 (b).

It will be noted that, for the sake of simplicity in the explanation, the actuator 11 will be regarded as being in the non-braking position. In this position such brake shoe 53 has a clearance (a) from the tread surface 4a of the wheel 4. It will be further assumed that there is no data stored in the stroke memory unit 22 of the clearance controller 14.

Figure 4B:
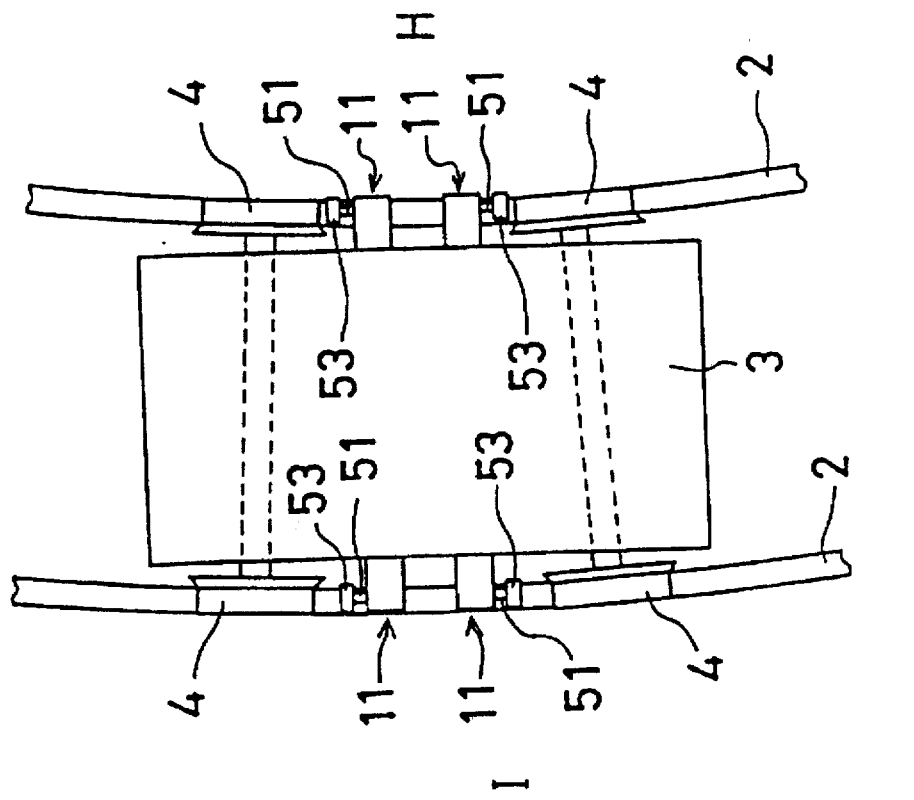
FIG. 4 shows a brake device in one embodiment of the present invention, (a) being a schematic diagram showing the brake device when the rolling stock is running on a straight-line track, and (b) being a schematic diagram showing the brake device when the rolling stock is running on a curved track.
Figure 4A:
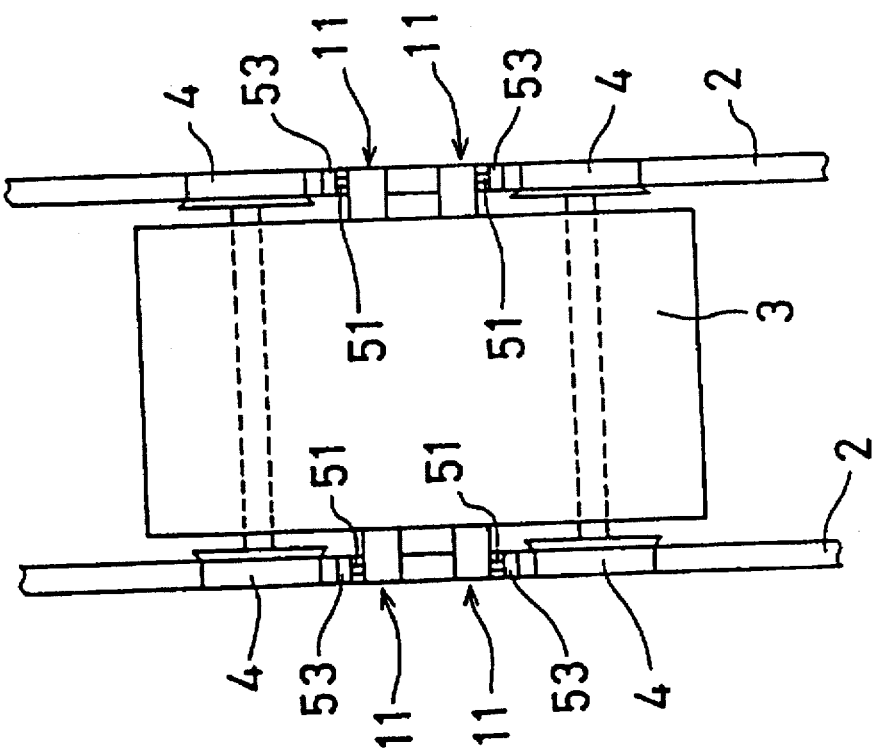

According to this invention, when the railroad driven rolling stock and/or associated undriven rolling stock 1 is operating on tracks 2 disposed in a straight line, as shown in FIG. 4 (a), in order to apply the brake shoes 53 to the tread surfaces 4a of the wheels 4 of the bogie 3, the drive motor 50 of the actuator 11 is driven to make the control sleeve 63 revolve. As such control sleeve 63 revolves the outer lock spring 65 is locked onto the control sleeve 63 in such a way that its inner diameter is reduced and the state of fastening of the outer lock spring 65 and the drive sleeve 58 is rendered releasable, which is to say the outer lock spring 65 is rendered able to turn in the opposite direction to the securing direction. Thus, the drive sleeve 58 is rendered free to revolve, due to the action of such coil spring 56, until the drive sleeve 58 is again secured on the housing 55 by the outer lock spring 65. Consequently, the turning movement of the drive sleeve 58 is suited to the turning movement of the control sleeve 63. Furthermore, during this turning movement, the projecting portion 63A of the control sleeve 58 fastens onto the projecting edge portion 66A of the inner lock spring 66 and the inner lock spring 66 is turned in the direction in which its inner diameter reduces. As a result, the inner lock spring 66 is locked and secured on the drive sleeve 58 and drive ring 67 and, therefore, the turning movement or torque is transmitted via the inner lock spring 66 to the drive ring 67. This constitutes the first step in the presently preferred embodiment of the method of operation of the brake device 10.

The turning force transmitted to the drive ring 67 is then transmitted to the spindle 73, via the spindle ring 75 spline-fitted to the drive ring 67, causing the spindle 73 to revolve and the above-mentioned revolving or rotary force is converted to a linear force due to the relationship with the ball nut 71 on which the spindle 73 is screwed, via the above-mentioned plurality of balls, and thus the ball nut 71 is moved toward the tread surface 4a of the wheel 4 while being guided by such spindle 73 together with the power-transmission sleeve 70. Thus, the brake shoe 53 attached to the power-transmission member 51, via and attachment member 78, is moved while the clearance (a) between it and the wheel 4 is narrowed until finally the brake shoe 53 is pushed against the tread surface 4a of the wheel 4, a braking force is generated and a braking action is applied to the wheel 4. At this time, when the reaction pressure, due to the pushing of the brake shoe 53 against the tread 4a of the wheel 4, acts on the brake shoe 53, this reaction pressure is transmitted, via the power-transmission member 51—the ball nut 71—the ball bearing 74—the cap member 76 and the resilient disc 77, to the pressure converter 17 of the pressure detection means 12 and the resulting detection signal is sent to the pressure detector 18. Furthermore, when the drive motor 50 is driven and the drive shaft 50a is revolved, the disc 19B turns in association with the fixed yoke 19A and, therefore, position signals are progressively sent from the encoder 19 to the position detector 20 and the braking stroke position signal b2, obtained by counting the position signals in the position detector 20, is sent to the computational processor 21. This constitutes a second step in the method of the present invention.

Next, the brake shoe 53 is progressively pushed against the tread surface 4a of the wheel 4 and the brakes are applied. The pressure detector 18 will then detect a reference value P (for example, P=2 KN) via the pressure converter 17 of the pressure detection means 12, whereupon the pressure signal b1 is sent from the pressure detector 18 to the computational processor 21 of the clearance controller 14 and the stroke position L1 based on the braking stroke position signal b2 at this time is sent from the position detector 20 of the position detection means 13 to the computational processor 21. For purposes of explanation of the invention this becomes the third step.

The computational processor 21 memorizes and stores the stroke position L1 during input of the pressure signal b1 as a reference stroke position La in the stroke memory unit 22. This is the fourth step of the invented method.

Furthermore, given the condition that a preceding reference stroke position L(a-1) is not memorized and stored in the stroke memory unit 22, the computational processor 21 of the clearance controller 14 takes the stroke position L1, which is now memorized and stored in the stroke memory unit 22 as the reference stroke La. This constitutes the fifth step in the present method.

The computational processor 21 now determines the stroke position L1 to be the return stroke position LM (i.e., clearance stroke Lb=0) of the brake shoe 53 attached to the end of the power-transmission member 51. This becomes step six in the method.

Next, in steps seven through nine of the present invention, in order to release the brake, a brake release command is sent to the clearance controller 14 by a means which is not depicted and the computational processor 21 sends a drive signal (c), which is equivalent to the return stroke position LM determined in Step six described hereinabove, to the drive motor 50. Thus, the drive motor 50 causes the drive shaft 50a to revolve in reverse to what was described in step one hereinabove. Thus, such spindle 73 revolves in reverse via the control sleeve 63—inner lock spring 66 and spindle ring 75, the ball nut 71 is moved in a straight line toward the cap member 76, and the brake shoe 53 is withdrawn from the tread surface 4a of the wheel 4.

At this time, when the drive shaft 50a of the drive motor 50 revolves in reverse, the disc 19B turns in association with the fixed yoke 19A and, therefore, position signals are progressively sent from the encoder 19 to the position detector 20 and the return stroke position signal b3 obtained by counting the position signals in the position detector 20 is sent to the computational processor 21. Then, the computational processor 21 compares the return stroke position signal b3, which was sent in this way, with the return stroke position LM determined in step six described above, and, on condition that the return stroke position signal b3 matches the return stroke position LM, the drive signal (c) to the drive motor 50 is released to stop the drive motor 50. Thus, the brake shoe 53 is withdrawn to a position in which it is separated by a predetermined clearance (a) from the tread surface 4a of the wheel 4 by the amount constituted by the return stroke position LM. This is the tenth step according to the method of operating the brake device 10 of the invention.

According to step eleven of the instant method, when the drive motor 50 is again driven and its drive shaft 50a is rotated in order to apply the brake shoe 53 to the tread surface 4a of the wheel 4, the computational processor 21 runs through an equivalent procedure to that described in steps one through four hereinabove and determines the reference stroke position La using the stroke position L1 based on the braking stroke position signal b2 during input of the pressure signal b1, and calls out the preceding reference stroke position L(a-1) memorized and stored in the stroke memory unit 22, compares the current reference stroke position La with the preceding reference stroke position L(a-1) and performs a process as indicated hereinbelow.

When the current reference stroke position La is<the preceding reference stroke position L(a-1), in other words when the driven rolling stock or associated undriven rolling stock 1 is operating on tracks 2 disposed in a curve, as illustrated in FIG. 4 (b), in the case of side H (the side with the curve where the relative displacement between the bogie 3 and the wheels 4 is reduced, where the pitch between the wheels 4 narrows), the reference stroke La memorized and stored in the stroke memory unit 22 is used as the preceding reference stroke L(a-1), and the preceding reference stroke L(a-1) is determined to be the return stroke position LM (clearance stroke Lb=0) of the brake shoe 53 attached to the end of the power-transmission member 51. This constitutes step twelve of the method.

On the other hand when the current reference stroke position La is ≧the preceding reference stroke position L(a-1), in other words when driven rolling stock or associated undriven rolling stock 1 is operating on tracks 2 disposed in a curve, as shown in FIG. 4 (b), in the case of side I (the side with the curve where the relative displacement between the bogie 3 and the wheels 4 is increased, where the pitch between the wheels 4 widens), the current reference stroke position La and the preceding reference stroke position L(a-1) are subtracted and compared with the setting value ST set in the computational processor 21 (for example ST=1.0 mm) and processing is carried out as indicated hereinbelow. This is the thirteen step in the method according to the invention.

In step fourteen of the present method, when La−L(a-1) is ≧the setting value ST, the current reference stroke position La and return stroke position LM are taken to be $$La\ (LM) = [L(a-1)] + \text{setting value ST} \tag{1}$$

and the current reference stroke position La found from the above formula [1] is memorized and stored in the stroke memory unit 22. (Step #14)

Furthermore, when La−L(a-1)<setting value ST, the stroke position L1 based on the braking stroke position signal b2 during input of the pressure signal b1, described hereinabove, is determined to be the reference stroke position La and return stroke position L1M (clearance stroke Lb=0), and the reference stroke position La is memorized and stored in the stroke memory unit 22.

Next, in order to release the brake, a brake release command is sent to the clearance controller 14 by a means which is not depicted, and the computational processor 21 sends a drive signal (c), which is equivalent to the return stroke position LM determined in step 6 and step 11 through step 14) described hereinabove, to the drive motor 50. Thus, the drive motor 50 drives the drive shaft 50a which revolves in reverse to what was described in hereinabove and the spindle 73 revolves in reverse via the control sleeve 63—the inner lock spring 66 and the spindle ring 75, the ball nut 71 is moved in a straight line toward the cap member 76 and the brake shoe 53 is withdrawn from the tread surface 4a of the wheel 4.

At this time, when the drive shaft 50a of the drive motor 50 revolves in reverse, the disc 19B revolves in association with the fixed yoke 19A and, therefore, the appropriate position signals are progressively sent from the encoder 19 to the position detector 20 and the return stroke position signal b3 obtained by counting the position signals in the position detector 20 is sent to the computational processor 21. Then, the computational processor 21 compares the return stroke position signal b3, which was sent in this way, with each return stroke position LM determined in step 6 and step 11 through step 14 described above, and, on condition that the return stroke position signal b3 matches each return stroke position LM comprising the reference stroke position La and clearance stroke Lb, determined in step 10, the drive signal (c) to the drive motor 50 is released to stop the drive motor 50. Thus, the brake shoe 53 is withdrawn to a position in which it is separated by a predetermined clearance (a) from the tread surface 4a of the wheel 4 by the amount constituted by each return stroke position LM.

It will be noted that the brake device 10 in the present embodiment has illustrated a case in which the clearance controller 14 has carried out all the stages from the above-mentioned step 1 through step 14, but it is not limited to this and it may be a combination of (1) one carrying out only the stages in step 1 to step 10 (excluding step 6) and steps 11, 13 and 14, (3) one carrying out only the stages in step 1 through step 10 and steps 11 and 13, (4) one carrying out only the stages in step 1 through step 10 (excluding step 6) and steps 11 and 12, and the like.

Thus, because the brake device 10 of the present invention is equipped with an actuator 11 having a power-transmission member 51 attached to the bogie 3 and generating a pushing force by receiving the drive force and moving so as to advance, a pressure-detection means 12 detecting the reaction pressure applied to the power-transmission member and a clearance controller making the power-transmission member 51 perform a return stroke based on the pressure signal from the pressure-detection means 12, and with a brake shoe 53 attached to the power-transmission member 51 and generating a braking force by being pushed against the wheel 4 tread surface 4a, and the clearance controller 14 is provided with a stroke memory unit 22 which detects when the pressure signal from the pressure-detection means 12 has reached a reference value when the pushing force of the power-transmission member 51 is output and memorizes the stroke position of the above-mentioned power-transmission member 51 at this time as the reference stroke position, and with a computational processor 21 which determines the return stroke position by which the power-transmission member 51 is separated from the wheel 4 tread surface 4a, and the clearance stroke fraction established in advance using the reference stroke position, when the pushing force is released, it follows that the clearance controller 14 can determine the return stroke of the above-mentioned power-transmission member 51 and brake shoe 53 using the position data of the power-transmission member 51 when the brake device 10 is operating, and can put the above-mentioned power-transmission member 51 and brake shoe 53 in the above-mentioned return stroke position and maintain the desired clearance (a) from the tread surface 4a of the wheel 4 on brake release.

Furthermore, because the stroke memory unit 22 is arranged so as to have the function of memorizing the preceding reference stroke and the computational processor 21 is arranged so as to add a setting value fraction smaller than the amount of relative displacement between the wheel 4 and bogie 3 to the preceding reference stroke position and so produce the current reference stroke position and above-mentioned return stroke position when the stroke position upon reaching the current reference value of the power-transmission member 51 exceeds the preceding reference stroke position, it follows that when on a curve such that the relative change between the wheel 4 and the bogie 3 is reduced, the power-transmission member 51 and brake shoe 53 attached thereto can be separated from the tread surface 4a of the wheel 4 by the amount of the return stroke position obtained by adding the setting value to the preceding reference stroke position and the clearance can be maintained, and, by storing the above-mentioned reference stroke positions progressively in the stroke memory unit 22, the clearance between the tread surface 4a of the wheel 4 and the brake shoe 53 can continue to be maintained even in continuous braking and release.

Additionally, because the computational processor 21 is arranged so as to use the stroke position upon reaching the current reference value or the preceding reference stroke position as the above-mentioned return stroke position and the current reference stroke position and to store the above-mentioned current reference stroke position in the stroke memory unit 22 when the difference between the stroke position upon reaching the current reference value of the power-transmission member 51 and the previous stroke position is less than the above-mentioned setting value, it follows that when on a curve such that the relative change between the wheel 4 and bogie 3 is increased, the power-transmission member 51 and brake shoe 53 secured thereto can be separated from the tread surface 4a of the wheel 4 by the amount of the return stroke position which is taken as the current reference stroke position or the preceding reference stroke position and the clearance can be maintained, and, by storing the preceding reference stroke positions progressively in the stroke memory unit 22, the clearance between the tread surface 4a of the wheel 4 and the brake shoe 53 can continue to be maintained even in continuous braking and release and, therefore, the power-transmission member 51 and connected brake shoe 53 can be moved by a suitable amount corresponding to the wheel running conditions and the desired clearance from the wheel 4 can be maintained.

Furthermore, because the stroke memory unit 22 is arranged so as to have the function of memorizing the preceding reference stroke and the computational processor 21 is arranged so as to take the preceding reference stroke position as the current stroke position and return stroke position when the stroke position upon reaching the current reference value does not exceed the preceding reference stroke position, it follows that the power-transmission member 51 and the brake shoe 53 connected thereto can be separated from the tread surface 4a of the wheel 4 in accordance with the preceding reference stroke position and the clearance can be maintained, and, by storing the preceding reference stroke positions progressively in the stroke memory unit 22, the clearance between such tread surface 4a of such wheel 4 and the brake shoe 53 can continue to be maintained even in continuous braking and release, and, therefore, the power-transmission member 51 and connected brake shoe can be moved by a suitable amount corresponding to the wheel running conditions and the desired clearance from the wheel 4 can be maintained.

It will be understood that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

We claim:

1. A brake device for a railway car, said brake device comprising:
    (a) an actuator means having a power-transmission member engageable with a bogie for generating a pushing force by receiving a drive force and moving so as to advance;
    (b) a pressure-detection means disposed on said brake device for detecting a reaction pressure being applied to said power-transmission member;
    (c) a clearance controller connected to said brake device for causing said power-transmission member to perform a return stroke based on a pressure signal from said pressure-detection means;
    (d) a brake shoe attached to said power-transmission member for generating a braking force by being pushed against a wheel tread surface;
    (e) a stroke memory unit disposed in said clearance controller for detecting when said pressure signal from said pressure-detection means has reached a reference value of such pushing force of said power-transmission member is output and memorizes a stroke position of said power-transmission member at this time as a reference stroke position; and (f) a computational processor for determining a return stroke position by which said power-transmission member is separated from such wheel tread surface and a clearance stroke fraction established in advance using said reference stroke position when said pushing force is released.

2. A brake device, as claimed in claim 1, wherein said stroke memory unit includes a function of memorizing a preceding reference stroke position.

3. A brake device, as claimed in claim 2, wherein said computational processor adds a setting value fraction smaller than an amount of relative displacement between such wheel and bogie to said preceding reference stroke position and so produces the current reference stroke position and said return stroke position when such stroke position upon reaching a current reference value of said power-transmission member exceeds said preceding reference stroke position.

4. A brake device, as claimed in claim 3, wherein said computational processor uses said stroke position of said power-transmission member upon reaching at least one of said current reference value and said preceding reference stroke position as said return stroke position and said current reference stroke position and stores said current reference stroke position in said stroke memory unit when a difference between said stroke position of said power-transmission member upon reaching said current reference value of said power-transmission member and a previous stroke position of said power-transmission member is less than said setting value.

5. A brake device, as claimed in claim 1, wherein said stroke memory unit includes a function of memorizing a preceding reference stroke and said computational processor utilizes said preceding reference stroke position as a current stroke position and said return stroke position when said stroke position upon reaching said current reference value does not exceed said preceding reference stroke position.

6. A method of operating an electrical type brake device provided on railroad rolling stock, said method comprising the steps of:

(a) applying a braking movement by powering a drive motor which creates a turning force and converting said turning force to a linear force which begins movement of a brake shoe against a wheel tread surface;

(b) transmitting said braking movement and a braking stroke position to a computational processor;

(c) pushing said brake shoe progressively against said wheel tread surface and detecting a reference pressure value and transmitting said reference pressure value and said braking stroke position to said computational processor which memorizes and stores said reference pressure value and said braking stroke position;

(d) causing said braking stroke position to be a return stroke position for such brake shoe when a preceding reference braking stroke position is absent in a memory unit disposed in such computational processor, (e) releasing such brake by transmitting a brake release command signal to said drive motor and reversing such procedure of steps (a), (b) and (c); and (f) comparing position signals which are progressively sent to said computational processor with a previously memorized return braking stroke position and withdrawing said brake shoe to said return braking stroke position.

7. A method of operating an electrical brake device provided on railroad rolling stock, according to claim 6, wherein said method includes the additional steps of:

(a) determining a return braking stroke position as said preceding reference braking stroke position when said current reference braking stroke position is less than said preceding reference braking stroke position;

(b) determining that a new return braking stroke position is needed when said current reference braking stroke position and said preceding reference braking stroke position are subtracted and compared to a setting value that is set in said computational processor; and (c) computing, memorizing and storing said new return braking stroke position.

8. A method of operating an electrical type brake device provided on railroad rolling stock, said method comprising the steps of:

(a) applying a braking movement by powering a drive motor which creates a turning force and converting said turning force to a linear force which begins movement of a brake shoe against a wheel tread surface;

(b) transmitting said braking movement and a braking stroke position to a computational processor;

(c) pushing said brake shoe progressively against said wheel tread surface and detecting a reference pressure value and transmitting said reference pressure value and said braking stroke position to said computational processor which memorizes and stores said reference pressure value and said braking stroke position;

(d) determining that a preceding reference braking stroke position is in such memory and comparing a current reference braking stroke position with said preceding reference braking stroke position;

(e) determining that a new return braking stroke position is needed when said current reference braking stroke position and said preceding reference braking stroke position are subtracted and compared to a setting value that is set in said computational processor;

(f) computing, memorizing and storing said new return braking stroke position;

(g) releasing such brake by transmitting a brake release command to said drive motor and reversing such procedure of steps (a), (b) and c; and (h) comparing braking stroke position signals which are progressively sent to said computational processor with a previously memorized return braking stroke position and withdrawing said brake shoe to said return braking stroke position.

9. A method of operating an electrical type brake device provided on railroad rolling stock, according to claim 8, wherein said method includes the additional step of:

determining said braking stroke position to be a return stroke position for such brake shoe when said current reference braking stroke position minus said preceding reference braking stroke position is less than said setting value that is set in said computational processor.

10. A method of operating an electrical type brake device provided on railroad rolling stock, according to claim 8, wherein said method includes the additional step of:

determining a return braking stroke position as said preceding reference braking stroke position when said current reference braking stroke position is less than said preceding reference braking stroke position.

* * * * *